(12) United States Patent
Matsuda

(10) Patent No.: US 8,651,848 B2
(45) Date of Patent: Feb. 18, 2014

(54) SIZING DEVICE

(75) Inventor: Koji Matsuda, Toyama (JP)

(73) Assignee: YKK Corporation (JP)

( * ) Notice: Subject to any disclaimer, the term of this patent is extended or adjusted under 35 U.S.C. 154(b) by 68 days.

(21) Appl. No.: 13/075,365

(22) Filed: Mar. 30, 2011

(65) Prior Publication Data

US 2011/0244067 A1    Oct. 6, 2011

(30) Foreign Application Priority Data

Mar. 31, 2010 (JP) ................................ 2010-081962

(51) Int. Cl.
*B29C 47/90* (2006.01)
*B29C 47/88* (2006.01)

(52) U.S. Cl.
USPC ........ 425/190; 425/71; 425/131.1; 264/210.2

(58) Field of Classification Search
USPC ............. 264/178 R, 184, 210.2, 210; 425/71, 425/131.1, 190, 271, 210
See application file for complete search history.

(56) References Cited

U.S. PATENT DOCUMENTS

| 6,592,351 B2 * | 7/2003 | Hutchison et al. .............. 425/71 |
| 2002/0098254 A1 | 7/2002 | Hutchison et al. |
| 2006/0157887 A1 * | 7/2006 | Schwaiger ................ 264/210.2 |

FOREIGN PATENT DOCUMENTS

| DE | 298 03 298 U1 | 5/1998 |
| DE | 10 2005 028084 A1 | 12/2006 |
| JP | H04 15521 | * 2/1992 |
| JP | H04 15521 U | 2/1992 |
| JP | 9-117955 | 5/1997 |

OTHER PUBLICATIONS

European Search Report, European Patent Application No. 11002573.1, mailed Jul. 12, 2011.

* cited by examiner

*Primary Examiner* — Joseph S Del Sole
*Assistant Examiner* — Lawrence D Hohenbrink, Jr.
(74) *Attorney, Agent, or Firm* — Kilpatrick Townsend & Stockton LLP

(57) ABSTRACT

A sizing device is installed on a downstream side in an extrusion direction of a die. A table having two sizing unit attachment portions which are adjacent to each other in a lateral direction orthogonal to the extrusion direction. The table is provided at a device body so as to be laterally movable between a first position where one of the two sizing unit attachment portions is at a production position and the other of the two sizing unit attachment portions is at a standby position, and a second position where the other of the two sizing unit attachment portions is at the production position and the one of the two sizing unit attachment portions is at the standby position. A sizing unit for production configured to perform cooling and sizing in practice is detachably attached to one of the two sizing unit attachment portions at the production position to coincide with an extrusion line. A sizing unit for replacement is detachably attachable to the other of the two sizing unit attachment portions at the standby position.

2 Claims, 7 Drawing Sheets

SIZING DEVICE

The disclosure of Japanese Patent Application No. 2010-081962 filed on Mar. 31, 2010, including a specification, drawings and claims is incorporated herein by reference in its entirety.

BACKGROUND

The present invention relates to a sizing device for a resin-molded article which sizes a resin-molded article in the state of being extruded from a die by an extruder, which is liable to deform thermally while being cooled, and thereby solidifying the article at a predetermined dimension and shape such that deformation is not caused.

Various kinds of sizing devices have conventionally been suggested as a sizing device for a resin-molded article.

For example as shown in Patent Document 1, there is suggested a first sizing device which includes a sizing die and a water tank and which sizes a resin-molded article extruded from a die by the sizing die while being cooled, thereby solidifying the article at a predetermined dimension and shape, and then passes the article through the water tank to bring the article to a normal temperature.

Additionally, as shown in Patent Document 2, there is suggested a second sizing device which enables a sizing die or a water tank set on a table to be replaced with a new sizing die and water tank.

Patent Document 1: JP-A-9-117955
Patent Document 2: US-A-2006-0157887

Since the aforementioned sizing devices use a sizing die and a water tank corresponding to a resin-molded article to be extrusion molded, it is necessary to replace the sizing die and the water tank when the die is replaced.

In the sizing device of the aforementioned conventional Patent Document 1, the replacement of the sizing die and the water tank is not described at all. However, generally, replacement is performed by detaching the old sizing die and water tank and then attaching the new sizing die and water tank. Thus, since the replacement task is troublesome, and it takes a long time, extrusion task efficiency deteriorates.

In the sizing device of the aforementioned conventional Patent Document 2, the sizing die and the water tank can be replaced by a replacing device. However, how the replacing task is specifically implemented is not disclosed. Thus, it is difficult to obtain a sizing device which can replace the sizing die and the water tank in a short time on the basis of the second sizing device.

SUMMARY

It is therefore an object of at least one embodiment of the present invention to provide a sizing device which enables a sizing die or a water tank to be replaced in a short time.

In order to achieve the above-described object, according to an aspect of the embodiments of the present invention, there is provided a sizing device installed on a downstream side in an extrusion direction of a die 2, the sizing device comprising: a device body 3; and a table having two sizing unit attachment portions which are adjacent to each other in a lateral direction orthogonal to the extrusion direction, the table provided at the device body 3 so as to be laterally movable between a first position where one of the two sizing unit attachment portions is at a production position and the other of the two sizing unit attachment portions is at a standby position, and a second position where the other of the two sizing unit attachment portions is at the production position and the one of the two sizing unit attachment portions is at the standby position, wherein a sizing unit for production configured to perform cooling and sizing in practice is detachably attached to one of the two sizing unit attachment portions at the production position to coincide with an extrusion line a, and wherein a sizing unit for replacement is detachably attachable to the other of the two sizing unit attachment portions at the standby position.

With this configuration, when an extrusion task is performed, a sizing unit for replacement is attached to the sizing unit attachment portion of the table at the standby position which deviates from the extrusion line a, and when the extrusion task is paused or ended, the table is laterally moved, and thereby, a sizing unit for replacement coincides with the extrusion line a, so that cooling and sizing can be performed on the next extrusion task.

Accordingly, the sizing die 6b and the water tank 6c can be replaced in a short time.

In the sizing device, the device body 3 may be movable in a vertical direction.

With this configuration, the sizing unit is vertically moved with the tables by moving the device body 3 in the vertical direction. Therefore, in a case where the height of the extrusion line a has varied depending on the sectional shape of a resin-molded article, the vertical center of the sizing unit 6 can be made to match the height of the extrusion line a by moving the sizing unit 6 vertically.

In the sizing device, the device body 3 may be reciprocatable in the extrusion direction such that the sizing unit 6 for production is come close to and separated from the die 2.

With this configuration, at the time of an extrusion task, the sizing unit 6 is come close to the die 2 so that the spacing between the sizing unit 6 and the die 2 can be a narrow gap suitable for an extrusion operation. At the time of replacement of a sizing unit, the sizing unit 6 is separated from the die 2 so that the gap between the sizing unit 6 and the die 2 can be a wide gap. As a result, the sizing unit 6 can be easily replaced without interfering with the die 2.

In the sizing device, the sizing unit has a sizing die 6b and a water tank 6c, a movable coupler mechanism 70 including a movable coupler 71 for cooling water and a movable coupler 72 for air suction which are vertically movable is attached to a position which coincides with the extrusion line a, fixing coupler mechanisms 80 each including a fixing coupler 81 for cooling water and a fixing coupler 82 for air suction, are respectively attached to the two sizing unit attachment portions such that the fixing couplers 81 and 82 of one of the sizing unit attachment portions, which coincide with the extrusion line a face the movable couplers 71 and 72 and the movable couplers 71 and 72 are connected to and separated from the fixing couplers 81 and 82 by vertically moving the movable couplers 71 and 72, the fixing coupler 81 and 82 for cooling water is configured to supply cooling water to a water channel of the sizing die 6b of the sizing unit 6, and the fixing coupler 82 for air suction is configured to suction air in an air channel of the sizing die 6b, and cooling water is capable of being supplied to the movable coupler 71 for cooling water and air of the moving coupler 72 for air suction is capable of being suctioned.

With this configuration, the movable coupler 71 for cooling water and the movable coupler 72 for air suction, of the movable coupler mechanism 70 can be vertically moved, and thereby connected to and separated from the fixing coupler 81 for cooling water and the fixing coupler 82 for air suction, of the fixing coupler mechanism 80 which coincides with the extrusion line a.

Accordingly, when the sizing unit 6 is replaced, the individual movable couplers 71 and 72 are vertically moved, so that cooling water can be supplied to the sizing die 6b of the sizing unit 6 which coincides with the extrusion line a, and air can be suctioned. Since this task is simple and can be performed in a short time, replacement of the sizing unit 6 can be performed in a short time.

DETAILED DESCRIPTION OF THE EMBODIMENTS

Figure 1:
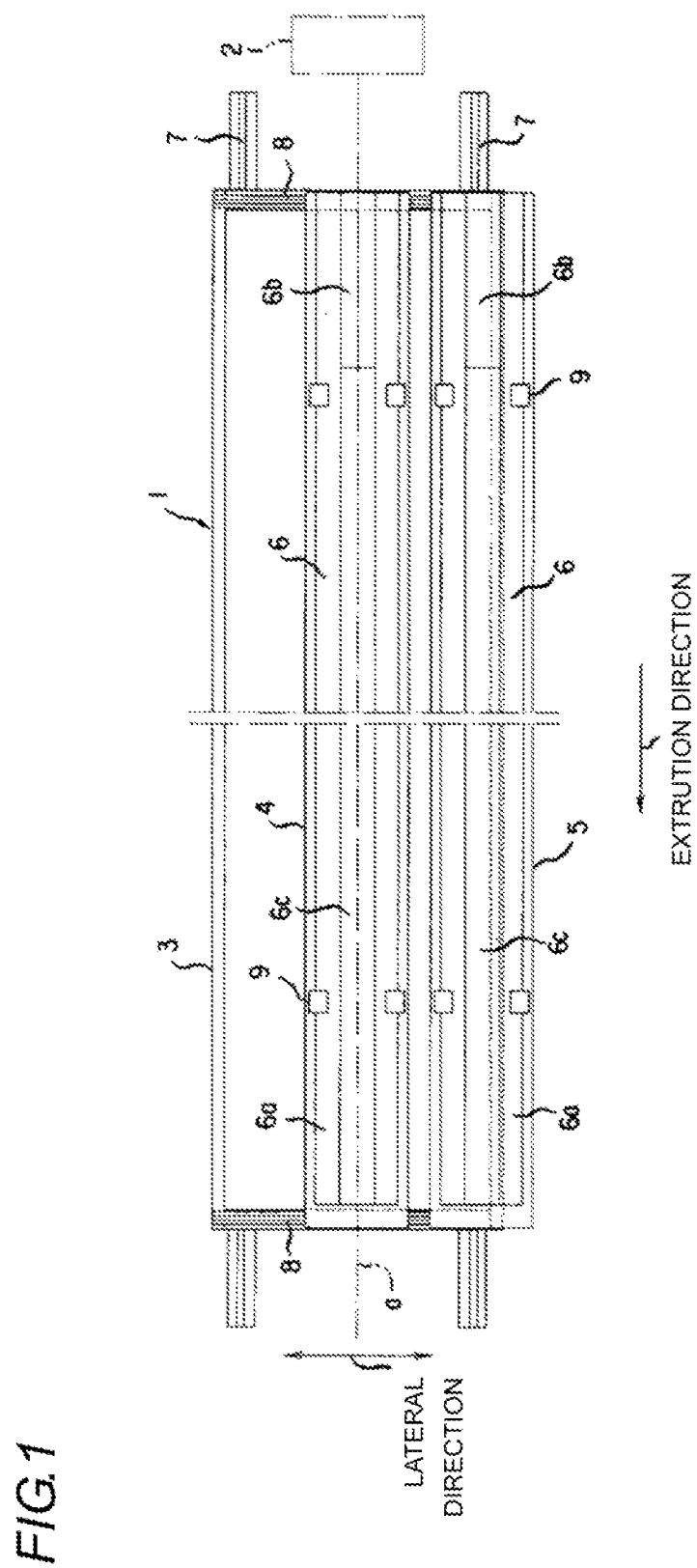
FIG. 1 is a schematic plan view of a sizing device showing an embodiment of the invention.

As shown in FIG. 1, a sizing device 1 of the invention is installed on the downstream side in an extrusion direction of the die 2.

The sizing device 1 includes a device body 3, a first table 4, a second table 5, and a sizing unit 6.

The device body 3 reciprocates along the extrusion direction, and moves in a vertical direction. For example, the device body approaches the die 2 along rails 7 installed along the extrusion direction, and moves in a direction (downstream) in which the device body separates from the die.

The first table 4 and the second table 5 are provided at an upper portion of the device body 3 at a distance from each other so as to be adjacent to each other in a lateral direction orthogonal to the extrusion direction, and the first and second tables 4 and 5 are laterally movable, respectively. For example, the top face of the device body 3 is provided with a plurality of guides 8, and the first and second tables 4 and 5 are laterally movable along the guides 8.

The sizing unit 6 is obtained by attaching a sizing die 6b and a water tank 6c to a substrate 6a, the substrate 6a is detachably fixed to the first table 4 and the second table 5 with a fixing means 9, and the sizing unit 6 is attached to the first table 4 and second table 5.

In the following description, a direction in which resin is extruded through the die 2 from an extruder (not shown) is defined as the extrusion direction, and a direction opposite to the extruder and away from the 2 is defined as the downstream. Also, a direction orthogonal to the extrusion direction on the horizontal plane is defined as the lateral direction, and a direction orthogonal to the horizontal plane is defined as the vertical direction.

The state shown in FIG. 1 is a production position where the first table 4 coincides with an extrusion line a and a standby position where the second table 5 deviates from the extrusion line a.

Figure 3:
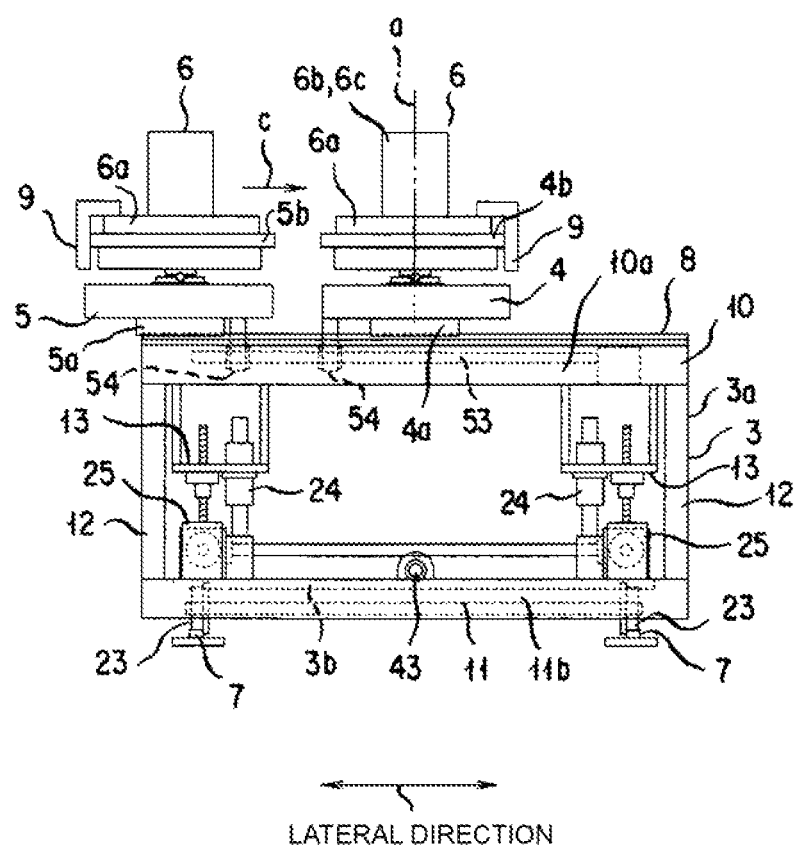
FIG. 3 is an enlarged detailed side view of the sizing device.
Figure 7:
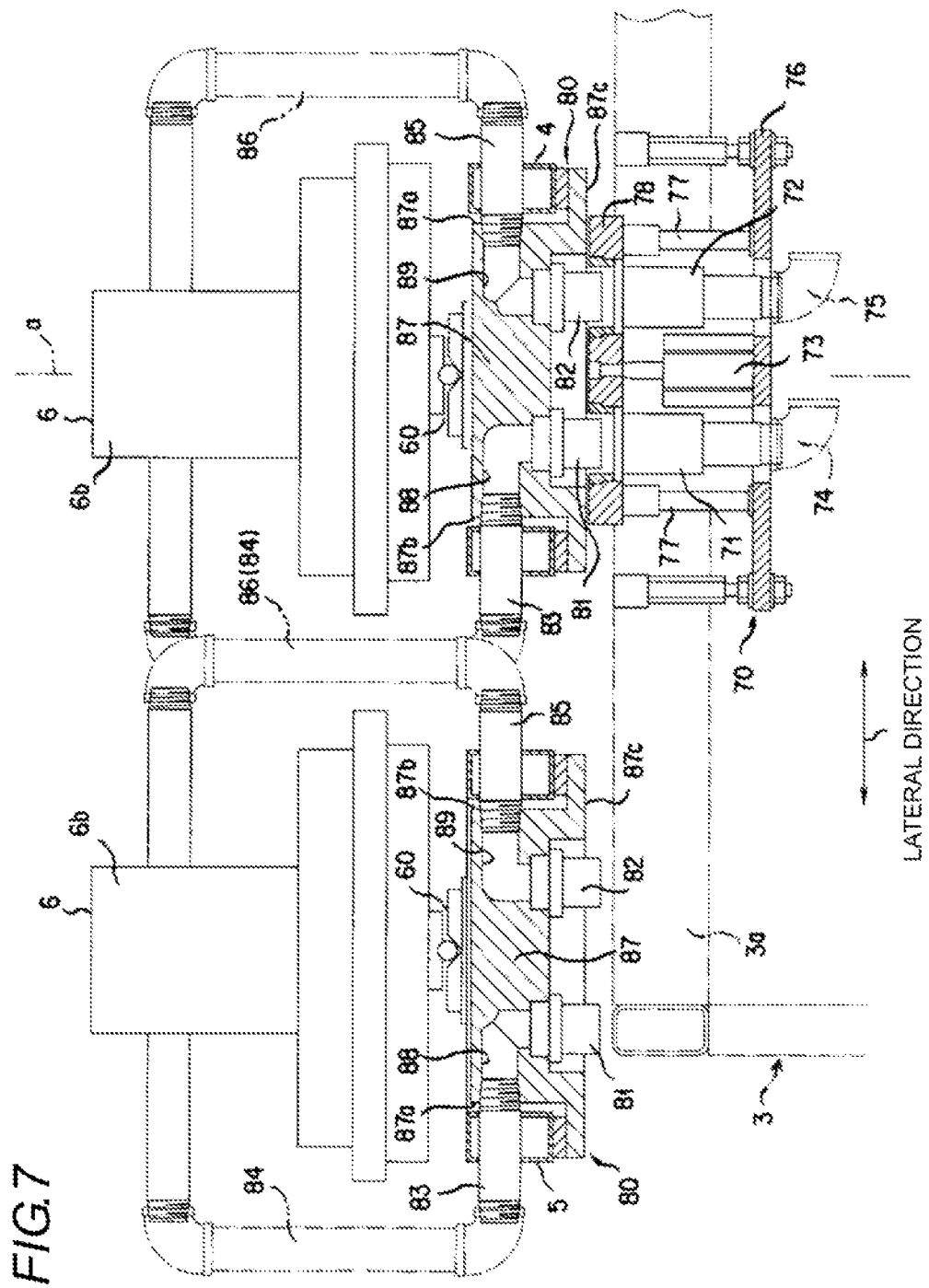
FIG. 7 is a sectional view taken along a line C-C of FIG. 6.

The extrusion line a is obtained by expressing a line, which extends in the extrusion direction on the same line as a resin-molded article to be extrusion molded, by an imaginary line. The extrusion line a is set to the center of gravity in a sectional shape of a resin-molded article. Here, in order to make the invention easily understood in the following illustration and description, for example, an imaginary line which extends in the vertical direction along the extrusion line a is shown in FIGS. 3 and 7 in order to describe the lateral position of the extrusion line a.

Thereby, the first table 4 is a table for production, and the sizing unit 6 attached to the first table 4 becomes a sizing unit for production which coincides with the extrusion line a and performs cooling and sizing in practice. The second table 5 is a table for the external setting up, and the sizing unit 6 attached to the second table 5 is a sizing unit for replacement which deviates from the extrusion line a, and stands by adjacent to the lateral direction of the aforementioned sizing unit for production.

In the sizing unit 6, a resin-molded article to be extrusion-molded through the die 2 is inserted through a frame member having a hole with a predetermined shape and is cooled in that state, and the inside of the sizing unit 6 is made into a negative pressure, thereby molding the resin-molded article in a soft state immediately after being extruded so as to have a predetermined dimension and shape through a hole with a predetermined shape, and curing the resin-molded article so as to become a resin-molded article. This is expressed by cooling and sizing. In addition, the negative pressure is a pressure lower than atmospheric pressure, and the pressure is made low by suctioning air.

When the first and second tables 4 and 5 are laterally moved from the state shown in FIG. 1 so as to bring the second table 5 to the production position which coincides with the extrusion line a, and the first table 4 is brought to the standby position which deviates from the extrusion line a, the second table 5 becomes the table for production, and the sizing unit 6 attached to the second table 5 becomes the sizing unit for production which coincides with the extrusion line a, and the first table 4 becomes the table for the external setting up which deviates from the extrusion line a. As a result, the sizing unit 6 attached to the first table 4 is detached, and a sizing unit for replacement is attached.

The external setting up is the setting up of the preparation required for the next production during production, and is thereby performed outside the extrusion line a under production.

For this reason, at the time of die replacement, the sizing unit 6 can be replaced by laterally moving the first table 4 and the second table 5.

Moreover, when an extrusion operation is performed, a sizing unit for replacement can be attached to the first or second table 4 or 5 at the standby position, and at the time of die replacement, the sizing unit can be replaced by laterally moving the first and second tables 4 and 5.

Accordingly, the sizing unit of the device body 3, i.e., the sizing die 6b and the water tank 6c can be replaced in a short time.

The first table 4 and the second table 5 may be one integral table. Since the first and second tables 4 and 5 are sizing unit attachment portions to which sizing units 6 are attachable, these tables may be tables which have two sizing unit attachment portions which are adjacent to each other in the lateral direction orthogonal to the extrusion direction and which are movable between a first position where any one sizing unit attachment portion is at the production position and the other sizing unit attachment portion is at the standby position, and a second position where the other sizing unit attachment portion is at the production position and the one sizing unit attachment portion is at the standby position.

By vertically moving the device body 3, the sizing unit 6 moves vertically along with the first and second tables 4 and 5. Thus, in a case where the height of the extrusion line a has varied depending on the sectional shape of a resin-molded article, the sizing unit 6 is vertically moved so that the vertical center of the sizing unit 6 can be matched to the height of the extrusion line a.

The center of the sizing unit 6 is the same position of the center of gravity of the sectional shape of the sizing unit 6.

By moving the device body 3 in the extrusion direction, the sizing unit 6 can be brought close to or separated from the die 2. Therefore, at the time of extrusion work, the sizing unit 6 is brought close to the die 2 so that the gap between the sizing unit 6 and the die 2 can be a narrow gap suitable for an extrusion operation, and at the time of replacement of a sizing unit, the sizing unit 6 is separated from the die 2 so that the gap between the sizing unit 6 and the die 2 can be a wide gap. As a result, the sizing unit 6 can be easily replaced without interfering with the die 2.

That is, if the sizing unit 6 is replaced with the gap between sizing unit 6 and the die 2 suitable for an extrusion operation being maintained, there is a concern that the sizing unit 6 interferes with the die 2. Thus, the replacement of the sizing unit should be carefully performed, and it is difficult to perform the replacing task.

Next, specific shapes of individual members will be described with reference to FIGS. 2 to 5. Here, FIG. 1 shows the members schematically in order to make the invention easily understood, and FIGS. 2 to 5 show the members shown in FIG. 1 in an enlarged manner and also show the members with an intermediate portion in the extrusion direction omitted. Thus, the members shown in FIG. 1 and the members shown in FIGS. 2 to 5 may be different from each other in terms of shape, dimension, and the like.

The device body 3 includes a table attachment portion 3a and a wheel attachment portion 3b.

The table attachment portion 3a is formed in a shape of a framework which is obtained by coupling together an upper frame body 10 and a lower frame body 11 using a plurality of vertical members 12 which extends vertically. The upper frame body 10 or the lower frame body 11 has a pair of horizontal members 10a or 11a which is long in the extrusion direction, and a plurality of short horizontal members 10b or 11b which couples together the pair of horizontal members 10a or 11a and extends laterally. The length of the table attachment portion 3a in the extrusion direction is longer than the length thereof in the lateral direction.

The wheel attachment portion 3b has a plurality of laterally directed horizontal members 20 which are provided at intervals in the extrusion direction, plates 21 attached to the vicinities of both lateral ends of the horizontal members 20, and coupling members 22 which couple together the respective horizontal members 20.

A pair of lateral wheels 23 is rotatably attached to each of the horizontal members 20.

The wheels 23 rotatably come into contact with the rails 7 installed on an installation surface.

Also, the wheel attachment portion 3b is coupled with the table attachment portion 3a so as to be movable by upper and lower guides 24, and the table attachment portion 3a is vertically moved with respect to the wheel attachment portion 3b by driving elevating mechanisms 25, so that the device body 3 can be vertically moved.

The upper and lower guides 24 and the elevating mechanisms 25 are respectively provided at the upper frame body 10 of the table attachment portion 3a between the plates 21, and auxiliary plates 13 secured to the plates 21, respectively, so as to face the plates.

Each guide 24 includes a guide barrel 24a secured to each auxiliary plate 13, and a guide post 24b erected from each plate 21, and the guide post 24b is slidably inserted into the guide barrel 24a.

Each elevating mechanism 25 includes a nut member 25a fixed to the auxiliary plate 13, and a screw 25b for upper and lower sides which is rotatably supported on the plate 21, and the auxiliary plate 13 is adapted to be vertically movable with respect to the plate 21 by screwing the screw 25b for upper and lower sides to the nut member 25a and rotating the screw 25b for upper and lower sides.

The vertical screw 25b of each elevating mechanism 25 is rotationally driven normally and reversely by the rotating mechanism 30.

Figure 4:
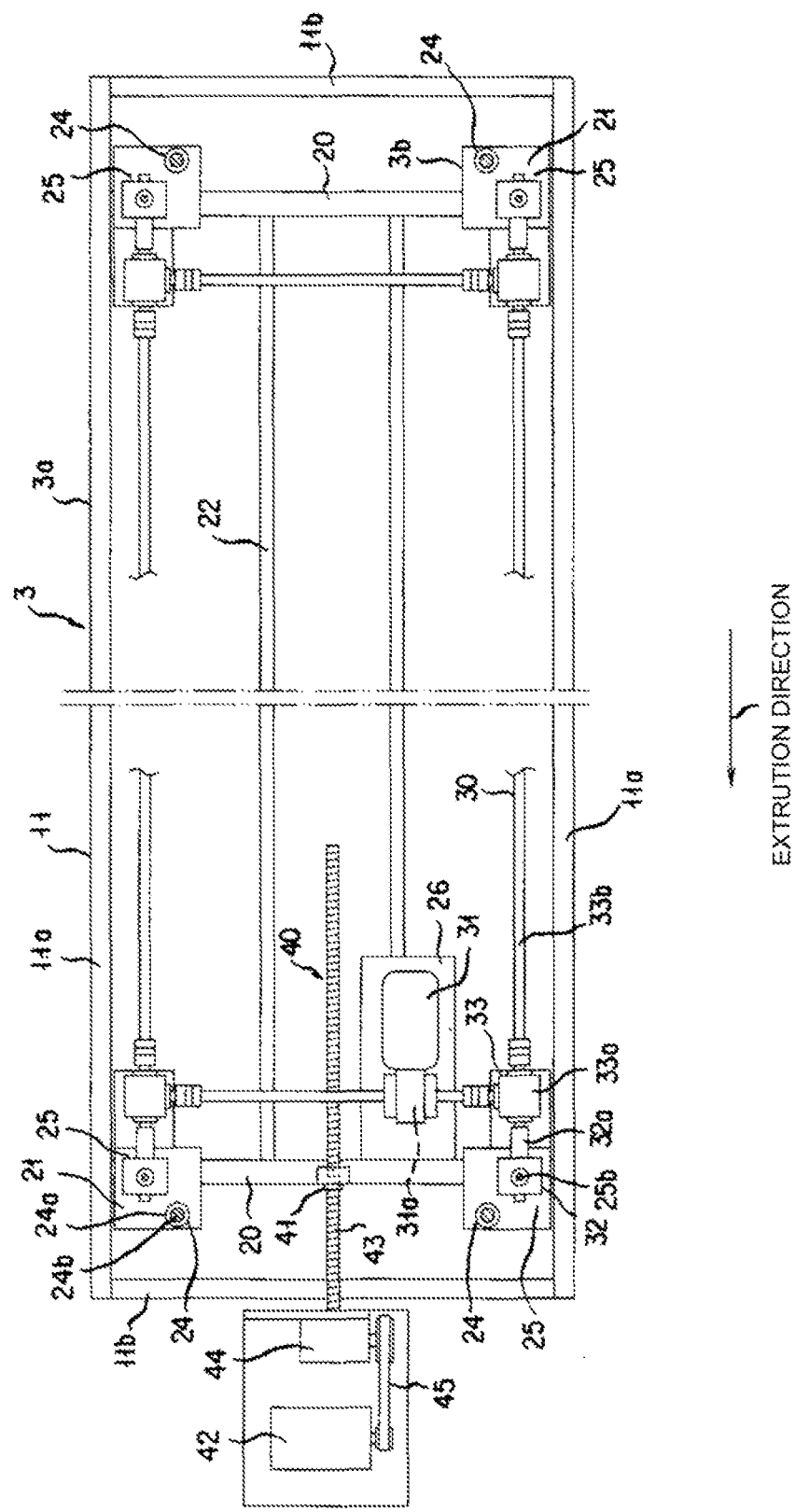
FIG. 4 is a cross-sectional view taken along a line A-A of FIG. 2.

As shown in FIG. 4, the rotating mechanism 30 includes a motor 31 for upper and lower sides attached to the attachment plate 25b secured to the wheel attachment portion 3b, i.e., the horizontal frame 20, a screw rotating portion 32 provided at each plate 21, and a rotation transmitting portion 33 which transmits the rotation of the motor 31 to each screw rotating portion 32.

The screw rotating portion 32 has a configuration in which the screw 25b for upper and lower sides is rotated by the rotation of a rotating shaft 32a, for example, a configuration in which the rotating shaft 32a and the screw 25b for upper and lower sides are linked with each other by a gear.

The rotation transmitting portion 33 couples an output shaft 31a of the motor 31 for upper and lower sides with each rotating shaft 32a by a transmission gear group 33a and a shaft 33b, and transmits the rotation of the output shaft 31a to each rotating shaft 32a.

For this reason, each rotating shaft 32a is normally and reversely rotated by rotating the motor 31 for upper and lower sides normally and reversely. Thereby, as the screw 25b for upper and lower sides are normally and reversely rotated, the table attachment portion 3a vertically moves with respect to the wheel attachment portion 3b.

The wheel attachment portion 3b is reciprocated in the extrusion direction by a moving mechanism 40.

The moving mechanism 40 includes a nut member 41 attached to the wheel attachment portion 3b, for example, the horizontal member 20, a motor 42 for movement attached to the installation surface b where the rails 7 are installed, and a screw 43 for movement which is normally and reversely rotated by the motor 42 for movement, and the screw 43 for movement is screwed to the nut member 41.

The screw 43 for movement is coupled with the output side of the motor 42 for movement via a speed reducer 44 and a belt 45. By driving the motor 42 for movement, the screw 43 for movement is normally and reversely rotated, the wheel attachment portion 3b moves in the extrusion direction by the wheels 23 along the rails 7, and the table attachment portion 3a moves in the extrusion direction along with the wheel attachment portion 3b.

The first table 4 or the second table 5 has a slider 4a or 5a which comes into contact with the guides 8, and is laterally moved by a table movement mechanism 50.

Figure 2:
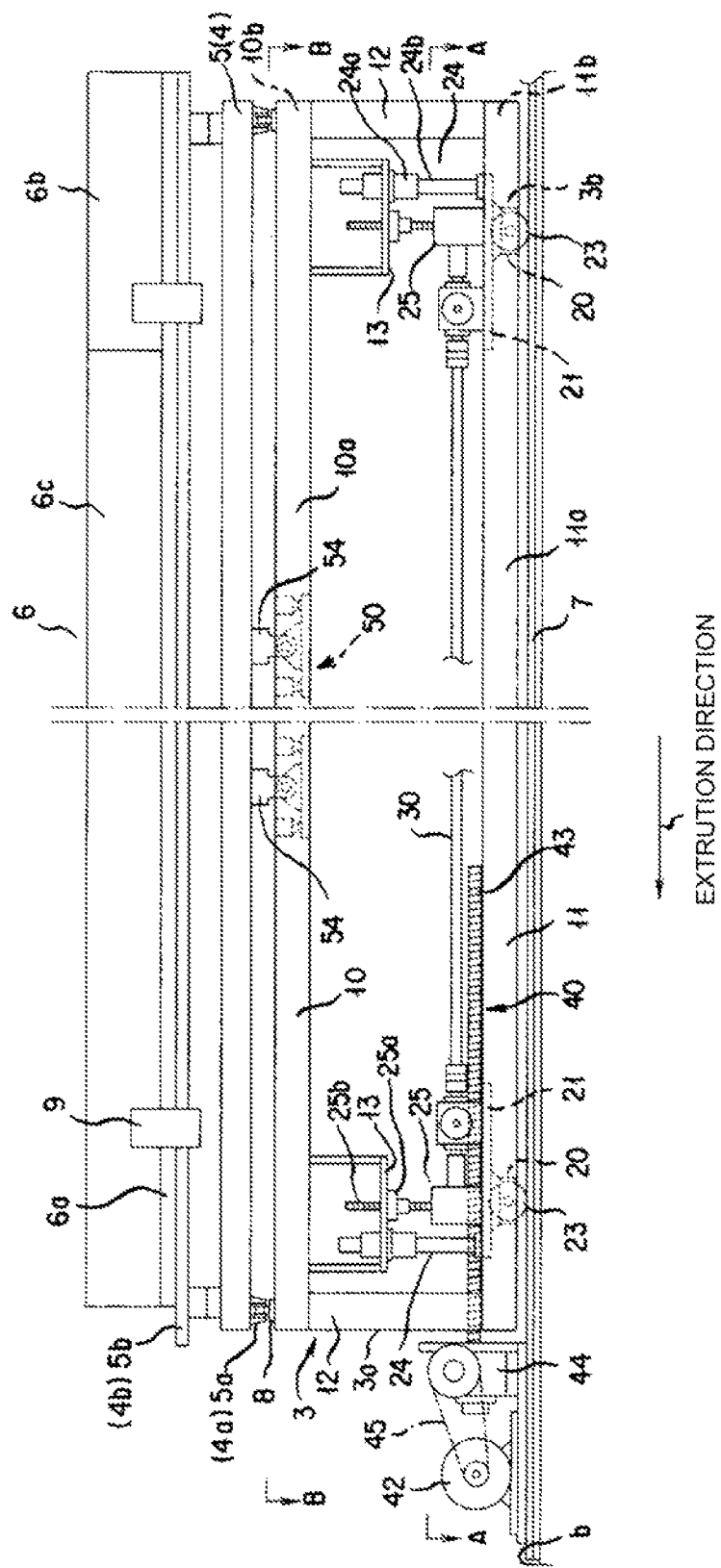
FIG. 2 is an enlarged detailed front view of the sizing device.
Figure 5:
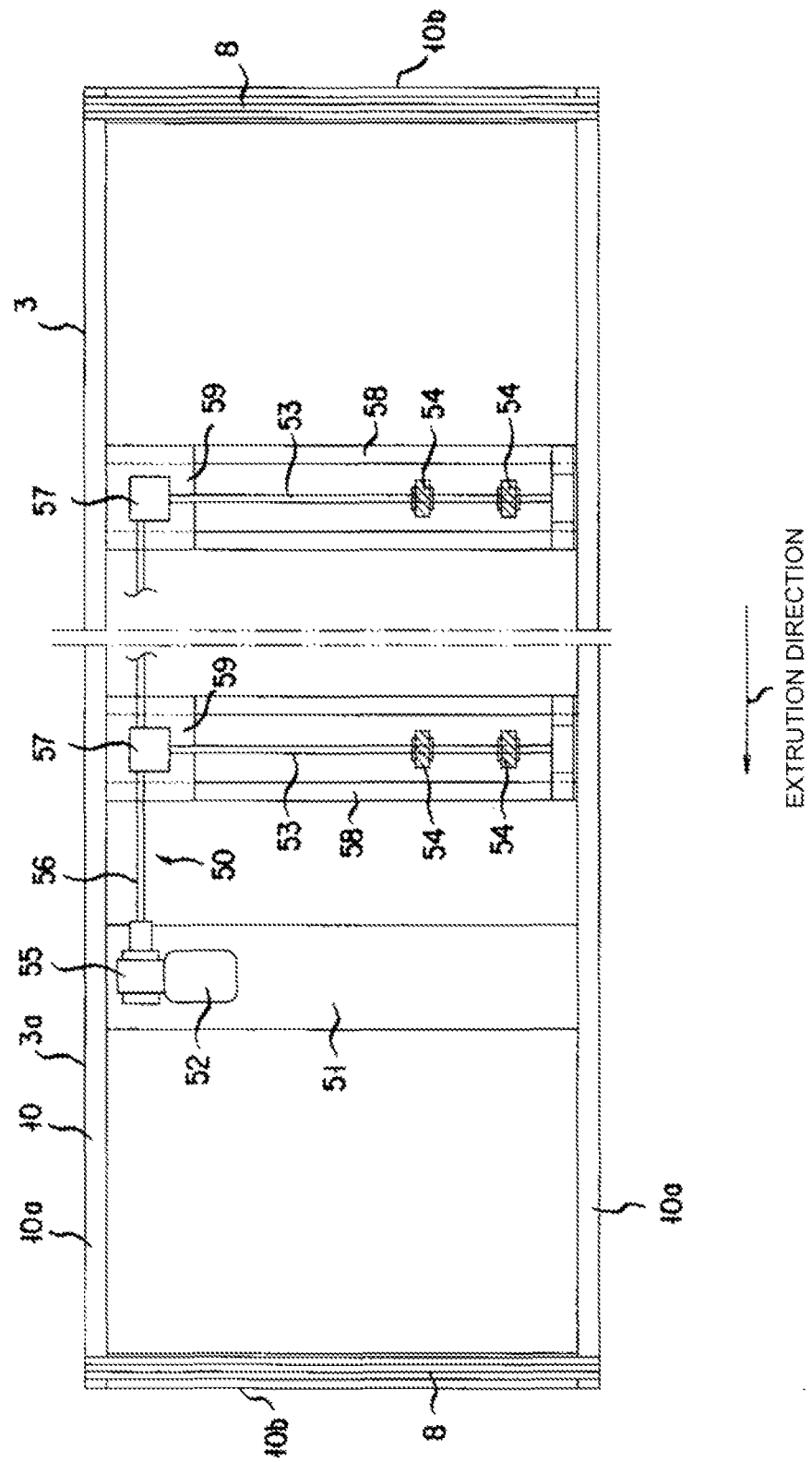
FIG. 5 is a cross-sectional view taken along a line B-B of FIG. 2.

As shown in FIG. 5, the table movement mechanism 50 includes a motor 52 for table movement attached to attaching horizontal member 51 which is laterally laid at an upper portion of the table attachment portion 3a of the device body 3, for example, between the horizontal members 10a of the frame body 10, screws 53 for lateral movement which are rotationally driven by the motor, and nut members 54 which are screwed to the screws 53 for lateral movement. As shown in FIGS. 2 and 3, the nut members 54 are secured to the first table 4 and the second table 5, respectively.

Also, by normally and reversely rotating the screws 53 for lateral movement using the motor 52 for table movement, the first table 4 and second table 5 move laterally in synchronization with each other, the sizing unit 6 attached to one of the first table 4 and the second table 5 coincides with the extrusion line a, and the sizing unit 6 attached to the other deviates from the extrusion line a.

In FIG. 3, the center of the sizing unit 6 attached to the first table 4 coincides with the extrusion line a.

When the first and second tables 4 and 5 are moved to one side in the lateral direction indicated by the arrow c from this state, the center of the sizing unit 6 attached to the second table 5 coincides with the extrusion line a.

The output side of the motor 52 for lateral movement is coupled with a rotating shaft 56 by a speed reducer 55, and the rotating shaft 56 is coupled with the screws 53 for lateral movement by a rotation transmitting portion 57.

The rotation transmitting portion 57 is attached to horizontal plates 59 provided at a pair of attachment horizontal members 58 coupled between a pair of horizontal members 10a.

In the aforementioned description, the guides 8, the upper and lower guides 24, the elevating mechanisms 25, and the pair of screws 53 for lateral movement are provided in one pair, respectively, in the extrusion direction. However, the invention is not limited thereto, and these members may be provided three or more, respectively, at intervals in the extrusion direction.

In the sizing unit 6, as shown in FIGS. 2 and 3, the substrate 6a of the sizing unit 6 is detachably coupled with attachment pedestals 4b and 5b of the first and second tables 4 and 5 by the fixing means 9.

The fixing means 9 may be any arbitrary members which can couple or separate the substrate Ga with/from the attachment pedestals 4b and 5b.

For example, the fixing means can be hooks provided on the attachment pedestals 4b and 5b of the first and second tables 4 and 5 and hook receptacles provided in the substrate 6a, a fixing means which moves the hooks to an engagement posture and a disengagement posture, using power, such as a manual operation, hydraulic pressure, motor torque, bolt and nut, and the like.

The attachment pedestals 4b and 5b are attached to the first and second tables 4 and 5.

The sizing die 6b has a water channel through which cooling water circulates and an air channel through which air circulates. While a hot resin-molded article extruded from the die 2 is cooled with the cooling water which circulates through the water channel, negative pressure is generated within the sizing die 6b with the air which circulates through the air channel, and the negative pressure is utilized to size the aforementioned resin-molded article. Thus, it is necessary to supply the sizing die 6b with cooling water and enable air to be suctioned into the sizing die.

For this reason, it is considered that the device body 3 must be provided with a cooling water tank, a water supply pipe, and a vacuuming pump, a water supply hose connected to the water supply pump is connected to the water channel of the sizing unit 6, an air suction hose connected to the vacuuming pump is connected to the air channel of the sizing unit 6. However, if this configuration is adopted, as mentioned above, the water supply hose and the air suction hose are reconnected when the sizing unit 6 is replaced. Thus, the task is troublesome and requires substantial time and effort, and the replacement time of the sizing unit becomes long.

Figure 6:
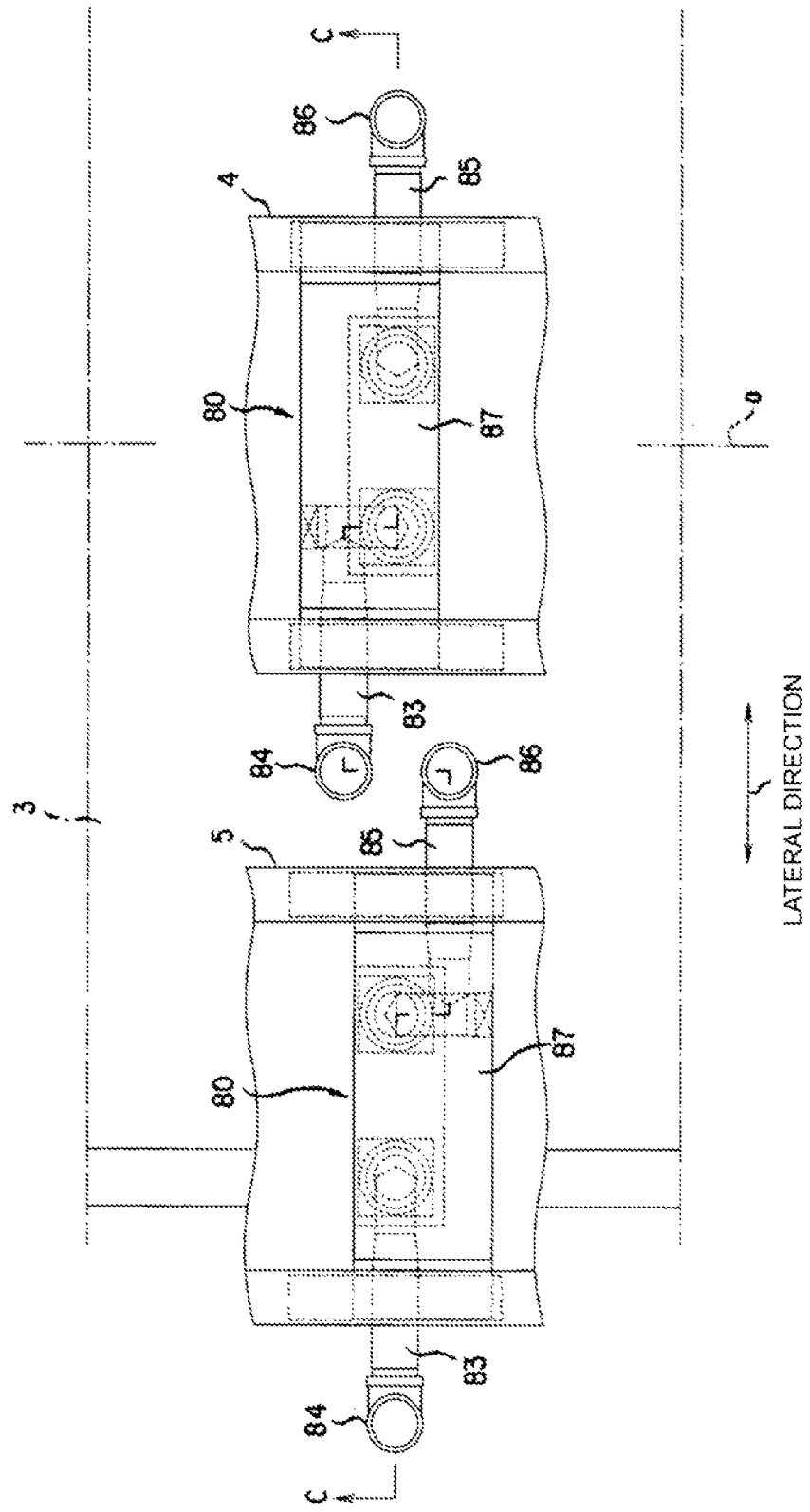
FIG. 6 is an enlarged plan view of a coupler mechanism attachment portion of a first table and a second table.

Thus, in the present invention, as shown in FIGS. 6 and 7, a movable coupler mechanism 70 is attached to the position of the device body 3 which coincides with the extrusion line a, fixing coupler mechanisms 80 are attached to the first table 1 and the second table 5 (two sizing unit attachment portions of the tables), respectively, and the movable coupler mechanism 70 is made attachable to and detachable from the fixing coupler mechanism 80 of the first table 4 or second table 5 which coincides with the extrusion line a. The coupler is a coupling portion which can be connected and separated.

The movable coupler mechanism 70 includes a movable coupler 71 for cooling water and a movable coupler 72 for air suction, and a moving cylinder 73 which vertically moves the movable couplers 71 and 72, respectively. A water supply hose 74 is connected to the movable coupler 71 for cooling water so that a cooling water pump (not shown) can be operated to supply water, and an air suction hose 75 is connected to the movable coupler 72 for air suction so that a vacuuming pump (not shown) can be operated to suction air.

Each fixing coupler mechanism 80 includes a fixing coupler 81 for cooling water and a fixing coupler 82 for air suction. The outflow side of the fixing coupler 81 for cooling water communicates with the water channel of each sizing die 6b by a nipple 83 and a first hose 84 (i.e., piping).

The inflow side of the fixing coupler 82 for air suction communicates with the air channel of each sizing die 6b by a nipple 85 and a second hose 86 (i.e., piping).

The inflow side and outflow side of the fixing couplers 81 and 82 of the fixing coupler mechanism 80 which coincides with the extrusion line a is connected to and separated from the movable couplers 71 and 72 of the movable coupler mechanism 70.

In FIG. 6, although the movable couplers 71 and 72 are male, and the fixing couplers 81 and 82 are female, the reverse may be true.

Additionally, illustration of the sizing die 6b is omitted.

For this reason, when the sizing die 6b is replaced from the state shown in FIG. 7, the individual movable couplers 71 and 72 are moved downward by the moving cylinder 73 and are separated from the individual fixing couplers 81 and 72 of the fixing coupler 80 provided at the first table 4.

Thereafter, the first and second tables 4 and 5 are laterally moved such that the centers of the second table 5 and the sizing die 6b coincide with the extrusion line a, and the individual movable couplers 71 and 72 are moved upward by the moving cylinder 73 and are fitted and connected to the individual fixing couplers 81 and 82 of the fixing coupler mechanism 80 provided at the second table 5.

Thereby, since cooling water can be supplied to the water channel of the sizing die 6b of the replaced sizing unit 6, the air within the air channel can be suctioned, and the aforementioned troublesome reconnection task of the hose becomes unnecessary, and the replacement time of the sizing unit 6 can be shortened.

The movable coupler mechanism 70 includes a main body 76 which is suspended and attached to the upper portion of the device body 3 (table attachment portion 3a), and a guide attachment body 78 attached to the main body 76 so as to be movable by upper and lower guides 77. The movable cylinder 73 is connected between the coupler attachment body 78 and the main body 76, and the moving cylinder 73 is extended and retracted, thereby vertically moving the coupler attachment body 78 such that the aforementioned movable coupler 71 for cooling water and movable coupler 72 for air suction move vertically.

In FIG. 7, the individual movable coupler 71 and 72 are moved upward and connected to the individual fixing couplers 81 and 82.

The fixing coupler mechanism 80 attaches the coupler attachment body 87 to the first and second tables 4 and 5, and the coupler attachment body 87 is formed with a first hole 88 and a second hole 89.

The first hole 88 and the second hole 89 open to lateral side faces 87a and 87b of the coupler attachment body 87 and have the nipples 83 and 85 connected thereto, and open to a lower face 87c and have the fixing coupler 81 for cooling water and the fixing coupler 82 for air suction connected thereto.

As shown in FIG. 7, the nipple 83 and the first hose 84, which are connected to the fixing coupler 81 for cooling water of the fixing coupler mechanism 80 attached to the first table 4, and the nipple 85 and the second hose 86, which are connected to the fixing coupler 82 for air suction of the fixing coupler mechanism 80 attached to the second table 5, shift in position in the extrusion direction so as not to interfere with each other.

For example, the fixing coupler mechanism 80 attached to the first table 4 and the fixing coupling mechanism 80 attached to the second table 5 are attached with their orientations changed by 180 degrees.

For this reason, since the lateral spacing between the first table 4 and the second table 5 can be made small, and thereby, the total width (lateral dimension) of the first and second tables 4 and 5 can be made small, the lateral movement stroke of the first and second tables 4 and 5 can be made short.

What is claimed is:

1. A sizing device installed on a downstream side in an extrusion direction of a die, the sizing device comprising:
   a device body; and
   a table having first and second sizing unit attachment portions which are adjacent to each other in a lateral direction orthogonal to the extrusion direction, the table provided at the device body so as to be laterally movable between a first position where the first sizing unit attachment portion is at a production position and the second sizing unit attachment portion is at a standby position, and a second position where the second sizing unit attachment portion is at the production position and the first sizing unit attachment portion is at the standby position,
   wherein a first sizing unit which is configured to perform cooling and sizing includes a first substrate, a first sizing die attached to the first substrate, and a first water tank attached to the first substrate and the first sizing unit is detachably attached to the first sizing unit attachment portion with a fixing member,
   wherein a second sizing unit which is configured to perform cooling and sizing includes a second substrate, a second sizing die attached to the second substrate, and a second water tank attached to the second substrate and the second sizing unit is detachably attached to the second sizing unit attachment portion with a fixing member,
   wherein the first sizing unit coincides with an extrusion line when the table is at the first position and the second sizing unit coincides with the extrusion line when the table is at the second position,
   wherein the device body is movable in a vertical direction,
   wherein the device body is reciprocatable in the extrusion direction such that one of the first and second sizing units can be moved close to or further from the die,
   wherein when one of the first and second sizing unit attachment portions is at the production position, the device body is moved in the vertical direction so that a height of one of the first and second sizing units is matched to a height of the extrusion line in the vertical direction, and
   wherein when one of the first and second sizing unit attachment portions is at the production position, the device body is moved in the extrusion direction so that one of the first and second sizing units is moved close to the die,
   wherein a movable coupler mechanism including a movable coupler for cooling water and a movable coupler for air suction is attached to a position which coincides with the extrusion line,
   wherein a first fixed coupler mechanism including a first fixed coupler for cooling water and a first fixed coupler for air suction, is attached to the first sizing unit attachment portion,
   wherein a second fixed coupler mechanism including a second fixed coupler for cooling water and a second fixed coupler for air suction, is attached to the second sizing unit attachment portion,
   wherein the movable coupler mechanism is disposed below the first and second fixed coupler mechanism,
   wherein the movable couplers are vertically movable such that the movable couplers are connected to and separated from the first fixed couplers when the table is at the first position and the movable couplers are connected to and separated from the second fixed couplers when the table is at the second position,
   wherein the first fixed coupler for cooling water is configured to communicate with a water channel of the first sizing die through a first nipple and a first hose to supply cooling water to the water channel of the first sizing die, and the first fixed coupler for air suction is configured to communicate with an air channel of the first sizing die through a second nipple and a second hose to suction air in the air channel of the first sizing die,
   wherein the second fixed coupler for cooling water is configured to communicate with a water channel of the second sizing die through a third nipple and a third hose to supply cooling water to the water channel of the second sizing die, and the second fixed coupler for air suction is configured to communicate with an air channel of the second sizing die through a fourth nipple and a fourth hose to suction air in the air channel of the second sizing die,
   wherein the movable coupler for cooling water is capable of receiving cooling water and the movable coupler for air suction is capable of suctioning air, and
   wherein the first nipple and the first hose which are connected to the first fixed coupler for cooling water and the fourth nipple and the fourth hose which are connected to the second fixed coupler for air suction shift in position in the extrusion direction.

2. The sizing device as set forth in claim 1,
   wherein the device body is provided with a table attachment portion and a wheel attachment portion,
   wherein the table attachment portion is movable in the vertical direction relative to the wheel attachment portion by driving an elevating mechanism to move the device body in the vertical direction,
   wherein the wheel attachment portion is reciprocatable in the extrusion direction by a moving mechanism, and
   wherein the first and second sizing unit attachment portions are a first table and a second table which are movable in the lateral direction by a table movement mechanism.

* * * * *